United States Patent [19]
Mayer

[11] Patent Number: 5,240,118
[45] Date of Patent: Aug. 31, 1993

[54] HIGH-SPEED TABLET SORTING MACHINE

[75] Inventor: Daniel W. Mayer, St. Paul, Minn.

[73] Assignee: Modern Controls, Inc., Minneapolis, Minn.

[21] Appl. No.: 947,064

[22] Filed: Sep. 18, 1992

[51] Int. Cl.$^5$ .............................................. B07C 5/02
[52] U.S. Cl. .................................. 209/539; 209/644; 209/919; 209/932; 198/380; 198/392
[58] Field of Search ............... 209/539, 644, 658, 660, 209/919, 932; 198/380, 392

[56] References Cited

U.S. PATENT DOCUMENTS

| | | | |
|---|---|---|---|
| 2,948,394 | 8/1960 | Frank et al. | 209/539 |
| 3,200,968 | 8/1965 | Gaddini | 198/380 X |
| 3,392,816 | 7/1968 | Cox | 198/380 |
| 3,554,372 | 1/1971 | Gutman | 209/658 X |
| 3,633,740 | 1/1972 | Westmoreland | 209/73 |
| 4,093,062 | 6/1978 | Sjögren | 198/380 |
| 4,223,751 | 9/1980 | Ayers et al. | 209/571 X |
| 4,405,126 | 9/1983 | Frye et al. | 209/644 X |
| 4,569,445 | 2/1986 | Kovats et al. | 209/539 |
| 4,635,798 | 1/1987 | Bruck | 209/644 |
| 4,860,229 | 8/1989 | Abbe et al. | 364/563 |
| 5,135,113 | 8/1992 | Mayer et al. | 209/539 |

FOREIGN PATENT DOCUMENTS 57-90314 6/1982 Japan .

Primary Examiner—Robert P. Olszewski
Assistant Examiner—Dean A. Reichard
Attorney, Agent, or Firm—Palmatier, Sjoquist & Helget

[57] ABSTRACT

An apparatus for feeding tablets in an aligned and uniformly oriented sequence onto a tablet measuring device, including a movable turntable having a deflector for guiding the tablets to a circumferential edge, a guide member and plow assembly respectively aligned in parallel and spaced apart relationship, the guide member having longitudinally-spaced air jets and the plow assembly having respective edge surfaces for slidably guiding tablets to a uniform orientation, and including a gate for removing particles and broken tablets from the channel to prevent them from being conveyed onto the measuring system.

15 Claims, 3 Drawing Sheets

HIGH-SPEED TABLET SORTING MACHINE

BACKGROUND OF THE INVENTION

The present invention relates to machines for weighing and classifying tablets, particularly at a high rate of speed. The invention is related to U.S. Pat. No. 5,135,113, issued Aug. 4, 1992, which utilizes the basic principle of capacitance, wherein the weight of a tablet can be determined within precise limits by passing the tablet through a capacitance sensor, and measuring the change in capacitance which results from the presence of the tablet in the sensor. The present invention is particularly related to the mechanism for reliably feeding a stream of tablets in proper orientation and without extraneous particles to the capacitance sensor.

In the prior art, high-speed machines have been developed for classifying pharmaceutical capsules, as in U.S. Pat. No. 4,223,751, issued Sep. 23, 1980, and owned by the assignee of the present invention. A further and related patent is found in U.S. Pat. No. 4,402,412, issued Sep. 6, 1983. In both of the foregoing patents the weight of a capsule in a stream of capsules is determined by passing the moving capsule through a fixed capacitive sensor arranged in tubular form, wherein the resultant change in capacitance provides a measure of capsule weight. A deflector mechanism is provided downstream in the path of capsule travel, and the capsules which are measured outside of certain weight parameters are deflected from the path of travel into a reject bin. Capsules which measure within the desired weight range are permitted to continue in the path of travel to be received in a second bin.

The basic capacitance principles of the foregoing patents are utilized in U.S. Pat. No. 5,135,113 in a constructional form to accommodate the different problems which arise in connection with measuring the weight of tablets versus measuring the weight of capsules. Whereas a capsule is constructed of uniform form, having a symmetry about a longitudinal axis, a tablet tends to be of nonuniform shape and of varying size. Capsules are symmetrical about a longitudinal axis and are therefore amenable to propagation through a tubular passage, whereas tablets are of somewhat nonuniform disk shapes, having a predetermined diameter and varying thickness dimensions. When tablets are propagated through a tube they tend to tumble and jam up in the flow path, thereby rendering devices of the type disclosed in the earlier patents useless for weighing and classifying tablets, and thereby inspiring the invention of the '113 patent. Tablets usually do not have flat top and bottom surfaces, but have surfaces with varying degrees of roundness. Tablets are much more prone to chip and break, and extraneous pieces of tablets frequently get mixed into the tablet stream and are conveyed along with good tablets.

The problem of conveying a stream of tablets into the sensing apparatus of the '113 patent, wherein the tablets in the stream are all properly oriented and the number of broken and extraneous tablet particles are held to an absolute minimum, is solved with the present invention.

SUMMARY OF THE INVENTION

The present invention comprises a table which rotates at a relatively slow rate of speed, as a tablet feeding device, to direct a stream of tablets onto a high-speed disk in an organized alignment. The feed mechanism is coupled to the high-speed disk to provide a serial stream of tablets onto the rotating disk surface, so that respective tablets may be oriented to a common position and spaced apart an arcuate distance about the disk. The invention includes an adjustable gate spaced apart and parallel from a guide member to form a channel for passage of tablets therebetween. The guide member has a plurality of selectively positioned air jets to assist in orienting the stream of tablets and to eject tablets which become jammed upon the table. The adjustable gate includes a plow assembly for assisting in the guiding and orientation of the tablet stream to ensure that the tablets are properly oriented at the point where they leave the slowly-rotating table. The tablets are guided along a straight line as they leave the table, past a guide arm which controls the path and orients the tablets to a level, non-tipped position. The guide arm contains a gate opening of a predetermined size, to permit smaller size particles to be carried through the guide arm to a disposal deflector.

It is the principal object of the present invention to provide a high-speed machine for weighing and wherein a turntable feed mechanism cooperates with a unique guide arm to align the tablets into a serial stream and orient the tablets in the stream to a uniform horizontal position on the table.

It is another object of the present invention to provide a high-speed weighing and classifying machine in which a continuous and serial stream of tablets may be measured without interruption, and small particles may be deflected into a disposal bin before passing through the measurement system.

It is another and further object of the present invention to provide a high-speed weighing and classifying machine which can make repeatable and accurate measurements of the weight of individual tablets in a continuous and serial stream of tablets.

The foregoing and other objects of the invention will become apparent from the following specification and claims, and with reference to the appended drawings.

DESCRIPTION OF THE PREFERRED EMBODIMENT

Figure 1:
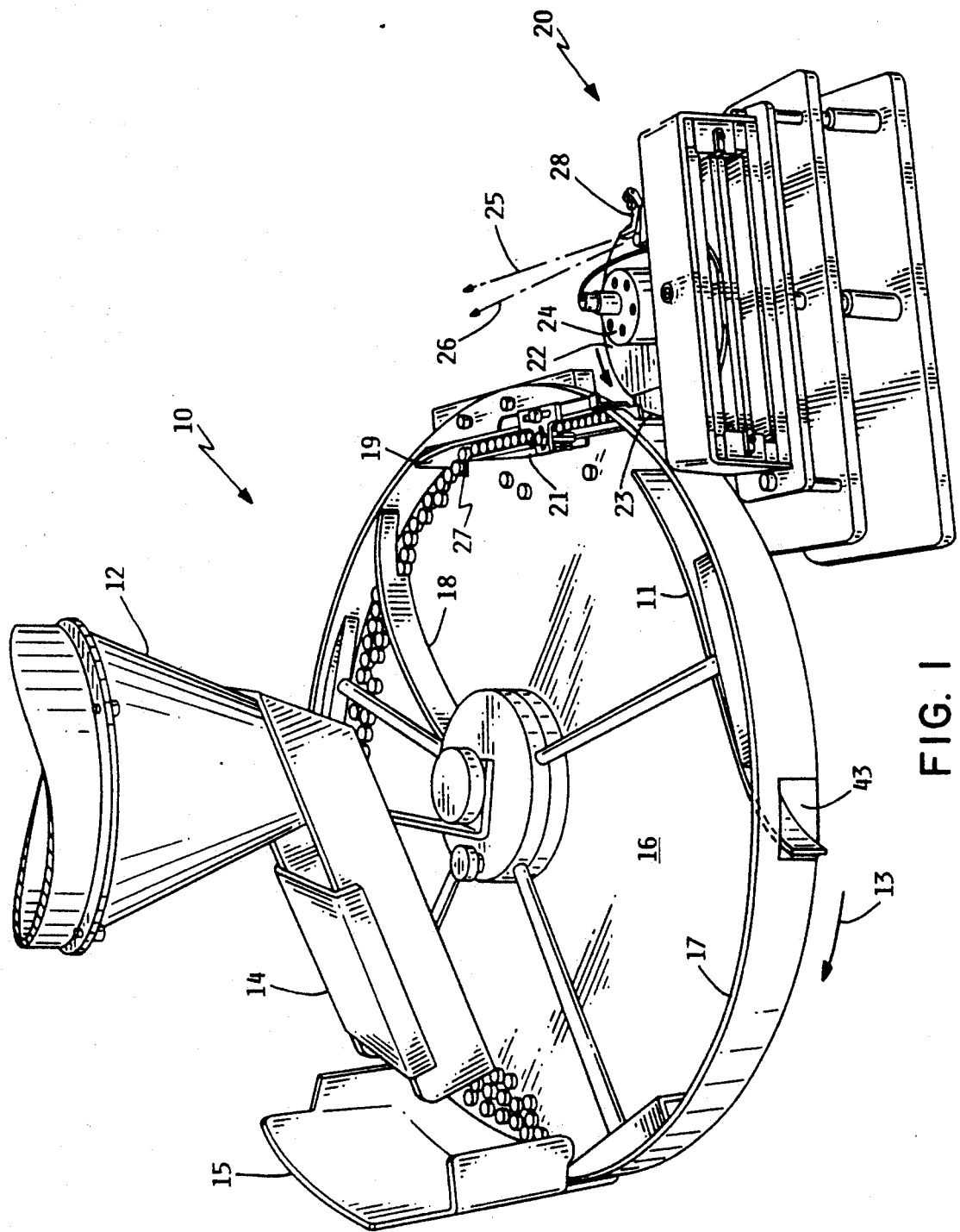
FIG. 1 shows an isometric view of the machine.

FIG. 1 shows the invention in isometric view. A feeder system 10 comprises a hopper 12, a chute 14 and a rotatable turntable 16, all of which are generally known in the prior art. Turntable 16 is generally rotatable at a rate of from six to ten revolutions per minute, depending upon tablet size, and the turntable typically has a diameter of 20 inches. A deflector 15 is positioned at the end of chute 14, to deflect tablets which slide downwardly through chute 14 onto the surface of turntable 16. Turntable 16 has a circumferential raised lip 17 to confine the tablets on the turntable. A curved deflector 18 is positioned close to the top surface of turntable 16, deflector 18 having an outer opening to permit tablets to pass therethrough. Curved deflector 18 forces tablets moving about turntable 16 to move to the outer circumference of turntable 16. A guide 19 is tangentially arranged relative to the outer circumference of turntable 16, and an adjustable gate 21 is positioned to permit only an aligned stream of tablets to flow along the tangential path adjacent guide 19.

As tablets are loaded into hopper 12, they pass through an opening in the bottom of hopper 12 into chute 14, and downwardly to the top surface of turntable 16. Tablets are carried by turntable 16 about a rotational direction as indicated by arrow 13. As the tablets pass through curved deflector 18 they are guided outwardly to the outer circumference of turntable 16, and more or less into a sequential stream of tablets into entrance 27. This sequential stream is further controlled by guide 19 and adjustable gate 21, to confine the tablet stream into a straight, sequential stream of tablets. This sequential stream of tablets is conveyed through an outer opening 23 in raised lip 17, to be received by sensor system 20. A reject guide 11 is provided along the inside edge of raised lip 17, spaced away from lip 17, to create a channel for guiding broken tablets and tablet particles from turntable 16 to an opening 43 in raised lip 17. A collection bin may be placed beneath opening 43 to collect the accumulated particles which are guided off turntable 16.

Sensor system 20 comprises a rotatable metal disk 22 which is typically about 5¼ inches in diameter. Disk 22 is rotated by a drive motor 24 at a controlled rotational rate of about 600 revolutions per minute. The tablets are guided about a rotational path along disk 22, and are ejected from disk 22 along either of two paths 25, 26 as illustrated by the broken lines in FIG. 1. A movable deflector 28 is controllable to control the deflection of the tablets along either path 25 or 26. Sensor system 20 may be adjusted vertically and horizontally to permit disk 22 to rotate freely at the same plane as turntable 16, and adjacent to turntable 16.

Figure 2:
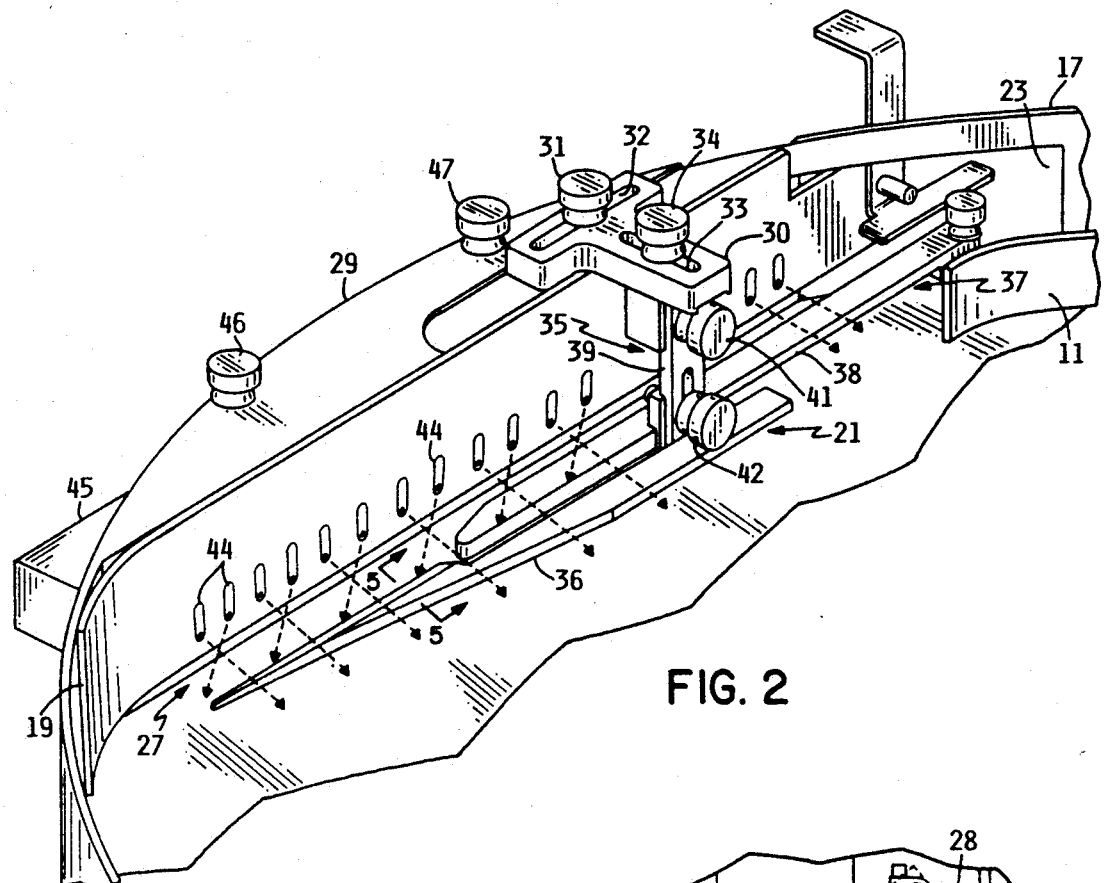
FIG. 2 shows an isometric view of the gate mechanism.

FIG. 2 shows an isometric view of the gate mechanism 21 of the present invention. An adjustable bracket 30 is affixed to the turntable housing 29 by a fastener 31. Bracket 30 has an elongate slot 32 so as to permit the bracket 30 to be affixed at any position along slot 32, to permit longitudinal adjustment of the gate mechanism 21. A fastener 34 permits lateral adjustment of a plow assembly 35 at any position along a transverse slot 33 in bracket 30. Plow assembly 35 comprises a lead plow 36 and a trailing plow 38. Lead plow 36 is affixed to an adjustable vertical bar 39. Vertical bar 39 may be adjustably positioned relative to bracket 30 by a fastener 41, which permits an adjustment of the lead plow height relative to the top surface of turntable 16. In the preferred operation fastener 41 is adjusted so that lead plow 36 is placed into light surface contact against turntable 16. A trailing plow 38 is adjustably positionable relative to bar 39 by means of fastener 42, which provides a trailing plow height adjustment relative to turntable 16, and relative to leading plow 36. Trailing plow 38 has a gate opening 37 along its undersurface for a short distance rearward of bracket 30. Gate opening 37 provides a clearance opening, less than the thickness of a standard tablet, to permit smaller tablet pieces and particles to be conveyed by turntable 16 out of gating mechanism 21 and off turntable 16, by passing through opening 43, guided by reject guide 11.

Guide 19 provides a smooth transition from raised lip 17 to the plow assembly 35, to guide tablets along the outer circumference of turntable 16 toward plow assembly 35. Guide 19 has a number of slotted openings 44 in alignment opposite the lead plow 36 and the trailing plow 38. The slotted openings 44 provide access ports for a plurality of air jets to be hereinafter described, the air jets being formed in an air manifold 45. Air manifold 45 is affixed to the turntable housing by means of fasteners 46 and 47, which may be adjusted to vary the height of air manifold 45 relative to turntable 16. The slotted openings 44 provide a limited vertical range of adjustment of air manifold 45, so as to permit passage of the air jets. The air jets are formed by passages drilled in air manifold 45 in a manner to be hereinafter described.

Figure 3:
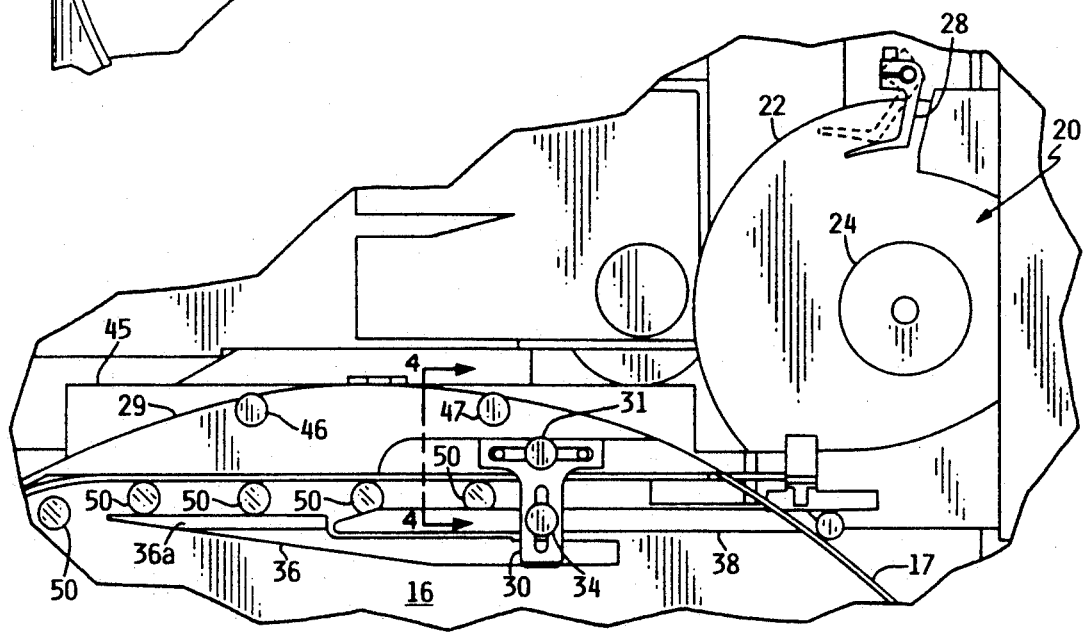
FIG. 3 shows a top view of the gate mechanism.
Figure 5:
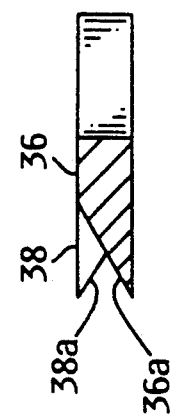
FIG. 5 shows a cross-section view taken along the lines 5—5 of FIG. 2.

FIG. 3 shows a top view of a portion of the sensor system 20 and the plow assembly 35. A plurality of tablets 50 are shown in their proximate alignment in a typical operational mode. The lead plow 36 and the trailing plow 38 are positioned outwardly from guide 19 so as to permit the free travel of tablets 50 therebetween. Lead plow 36 has an upwardly inclined plane surface 36a along its edge facing guide 19 so as to permit tablets which may become clustered together to slide over the plow back onto turntable 16. Conversely, the trailing plow 38 has a downwardly inclined plane surface 38a (see FIG. 4) which is inclined downwardly toward turntable 16 so as to contain tablets and prevent them from passing over the top of trailing plow 38. The downwardly inclined plane surface 38a will slidably guide the curved tablet top surface to retain the tablet in a stable, upright position as the tablet 50 moves along the channel created between guide 19 and trailing plow 38. This relationship is best seen with reference to FIG. 4, which is a cross-sectional view taken along the lines 4—4 of FIG. 3. This view shows a tablet 50 resting upon turntable 16, and guided between guide 19 and the inclined plane surface 38a of trailing plow 38.

Figure 4:
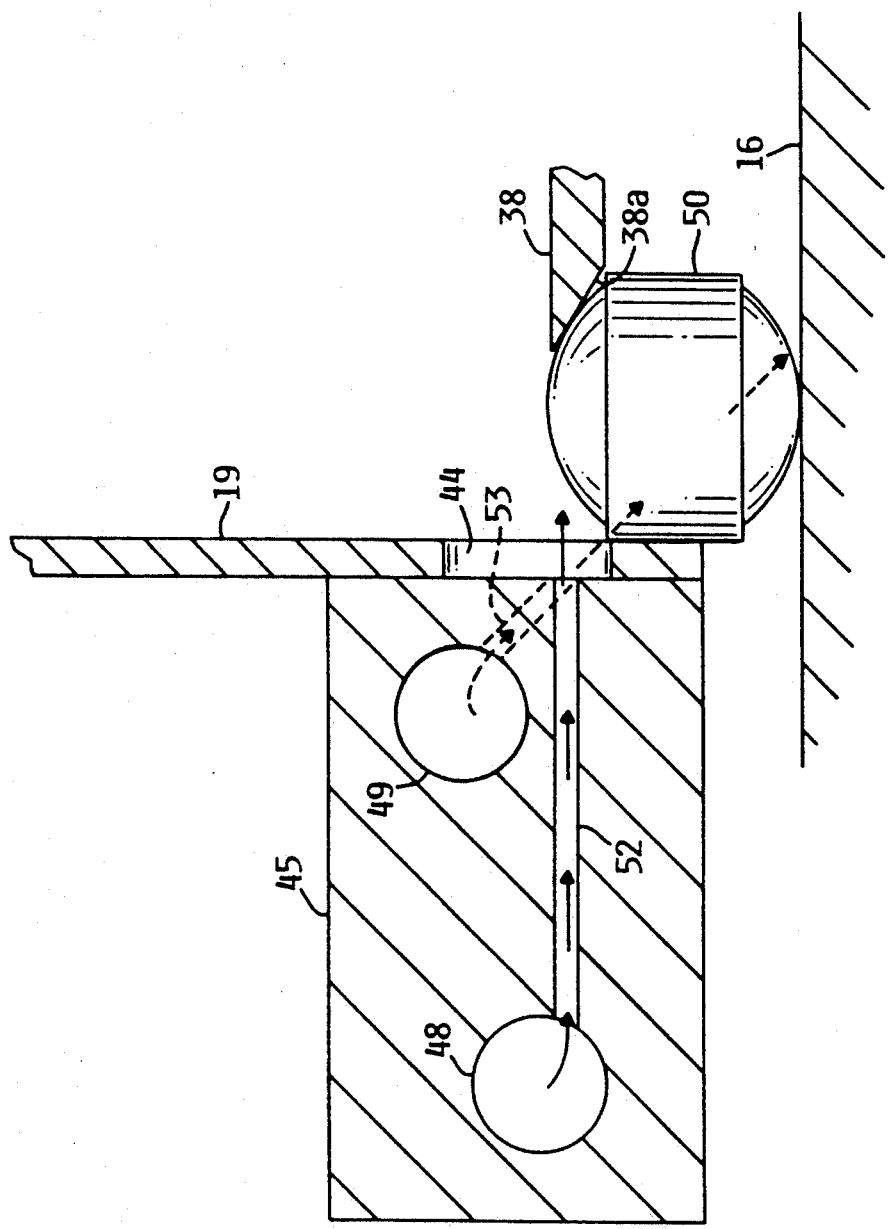
FIG. 4 shows a cross-section view taken along the lines 4—4 of FIG. 3.

FIG. 4 also illustrates the position of air manifold 45 in relation to the other elements of the invention. Air manifold 45 has a first longitudinal air passage 48 and a second longitudinal air passage 49. Both of these passages are drilled substantially the entire elongate length of air manifold 45, opening through one end surface of air manifold 45. The end surface of air manifold 45 through which the passages 48 and 49 open is adapted for connection to sources of pressurized air. A plurality of parallel drilled passages 52 are formed along the elongate length into passage 48 at regular spaced intervals. A plurality of inclined passages 53 are drilled through air manifold 45 into passage 49 at spaced intervals along its longitudinal length. Passages 52 are substantially horizontal and parallel to turntable 16, whereas passages 53 are inclined downwardly from the horizontal at an angle of approximately 30°. Further, passages 53 are inclined toward the direction of the tablet entrance point 27 at an angle of approximately 60° relative to the direction of passages 52. Passages 52 and 53 have exit openings from air manifold 45 at substantially the same height level, and are positioned so as to pass through the slotted openings 44 in guide 19. The height of passages 52 is proximate the top of a tablet 50 when the tablet 50 is resting on turntable 16. The passages 52 and 53 are respectively alternated for a predetermined distance along the longitudinal length of air manifold 45, so as to provide alternate horizontal air passages and inclined air passages. Passages 53 are eliminated for a predetermined distance proximate the trailing end of plow 38, and only passages 52 exist along this predetermined distance. Pressurized air through air passages 52 impact over the top surface of a tablet 50, tending to orient the tablet 50 in a stable, upright position as it passes along the channel between guide 19 and leading and trailing plows 36, 38. If any tablets are positioned on edge as they pass through the channel, the air jets from passages 52 will force the tablets out of the channel and back onto turntable 16. Pressurized air in passages 53 is utilized to assist in unjamming a flow of tablets which may have become clogged while passing along the channel. A blast of pressurized air which is directed through these passages 53 will tend to blow interfering tablets away from obstruction of the channel, and in particular may blow such tablets over the inclined surface 36a of leading plow 36. Passages 52 are directed over the curved top surface of tablet 50, exerting a downward force which resists the tendency of tablet 50 to become tipped as it passes along the channel. The air jets from passages 52 act cooperatively with the inclined surface 38a of trailing plow 38 to maintain the tablets in a stable orientation during the path of travel of the tablets between guide 19 and trailing plow 38.

In operation, the disk 22 of the sensor system 20 typically rotates at about 600 rpm, whereas the turntable 16 of the feeder system 10 typically rotates at about 6 rpm. The tablets are poured in bulk into hopper 12, and they roll down chute 14 onto turntable 16. As the turntable rotates the tablets are forced toward the outer edge of turntable 16 by deflector 18, and into more or less an end-to-end alignment along the inner edge of lip 17. The aligned tablets are guided into the entrance 27 between the guide 19 and the plow assembly 35, moving down the channel formed between these members by the continual rotational movement of turntable 16. As the tablets move down the channel they are further aligned to an upright position by the leading and trailing plows, and the air jets from manifold 45, until they slidably move onto the disk 22. Disk 22 conveys each tablet it receives at a high rate of speed, thereby providing separation between adjacent tablets, and conveys the tablets through the sensor system. Broken tablets and tablet particles which may have accumulated on turntable 16, and which become conveyed among the tablets along the channel between guide 19 and plow assembly 35 are permitted to escape via gate opening 37 beneath trailing plow 38. These tablet particles continue to be conveyed by turntable 16 until they reach a trailing deflector which guides them off turntable 16 into a separate trash bin. If the tablets jam up at any point during their passage along the channel between guide 19 and plow assembly 35 the downwardly and rearwardly deflected air jets from air manifold 45 are turned on to forcibly eject the tablets from the channel, and to move them back onto turntable 16 where they will be conveyed around the turntable a second time. In one embodiment of the invention, the electronic circuitry associated with sensor 20 monitors the time between tablet passages, and when it detects a gap in the sequential array of tablets it automatically activates a circuit which turns on the deflection air jets to clear the channel. Tablets may be conveyed around turntable 16 several times before reaching the proper alignment for feeding into the entrance point 27, but eventually all tablets will be metered into the entrance point 27.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for conveying tablets in an aligned stream and uniform orientation, comprising,
   a) a rotatable turntable and means for loading bulk quantities of tablets onto said turntable, including means for deflecting said tablets toward the outer periphery of said turntable;
   b) a guide member positioned above and closely adjacent said turntable, said guide extending from a first outer periphery point to a second outer periphery point, and having a plurality of spaced apart air jets along its extent;
   c) an adjustable gate positioned in parallel and spaced apart relation to said guide, said gate having a portion thereof positionable to slidably engage against top surfaces of said tablets; and
   d) an opening in said gate, said opening being smaller than the height of a tablet and positioned in facing relation to said turntable.

2. The apparatus of claim 1, wherein said adjustable gate further comprises a forward plow portion and a rearward plow portion, said forward plow portion having an inclined surface portion positionable close to said turntable and inclined upwardly away from said guide.

3. The apparatus of claim 2, wherein said rearward plow portion further comprises an inclined surface portion inclined downwardly away from said guide.

4. The apparatus of claim 3, further comprising means for vertically adjusting said forward plow portion and said rearward plow portion.

5. The apparatus of claim 1, further comprising an air manifold adjacent said guide member, said air manifold having at least two channels therein, said channels being coupled to air passages for forming said air jets.

6. The apparatus of claim 5, wherein one of said channels is coupled to a plurality of first air passages, said plurality of first air passages aligned in respective parallel alignment with each other and with said turntable.

7. The apparatus of claim 6, wherein the other of said channels is coupled to a plurality of second air passages, said plurality of second air passages aligned in respective parallel alignment with each other and inclined downwardly toward said turntable.

8. The apparatus of claim 7, wherein said first and second passages are respectively alternately positioned along a portion of the elongate length of said air manifold.

9. The apparatus of claim 8, further comprising means for vertically adjusting said air manifold.

10. The apparatus of claim 9, wherein said manifold further comprises an elongate length proximate the elongate length of said adjustable gate.

11. An apparatus for conveying tablets in uniform alignment and orientation from the peripheral edge of a rotating turntable, comprising:
   a guide channel formed from a first point on the peripheral edge of said turntable to a second point on the peripheral edge of said turntable, said guide channel formed between a guide member and an adjustable gate aligned parallel to said guide member;
   said adjustable gate comprising a forward plow and a rearward plow, and means for vertically adjusting both of said plows;
   an air manifold adjacent said guide member, said air manifold having a plurality of passages opening toward said channel; and means on said adjustable gate for slidably contacting the upper surface of tablets conveyed along said channel.

12. The apparatus of claim 11, wherein said forward plow further comprises an inclined surface portion positionable adjacent to said turntable, said surface portion being inclined upwardly away from said channel.

13. The apparatus of claim 12, wherein said rearward plow further comprises an inclined surface portion which further comprises said means for slidably contacting the upper surface of tablets.

14. The apparatus of claim 13, wherein said rearward plow further comprises an open portion facing said turntable, said open portion being sized smaller than a tablet.

15. The apparatus of claim 14, wherein said plurality of air manifold passages further comprise a first set of passages aligned proximately parallel with said turntable and a second set of passages inclined toward said turntable and said guide channel.

* * * * *